(12) United States Patent
Furneaux et al.

(10) Patent No.: US 8,549,539 B2
(45) Date of Patent: Oct. 1, 2013

(54) PROGRAMMATIC MODIFICATION OF A MESSAGE FLOW DURING RUNTIME

(75) Inventors: Antony Furneaux, Southampton (GB);
Gregory Lubel, Southampton (GB);
Anthony Phillips, Southampton (GB);
Dominic Storey, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/966,726

(22) Filed: Dec. 13, 2010

(65) Prior Publication Data

US 2012/0151498 A1 Jun. 14, 2012

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............................ 719/313; 719/318; 719/320

(58) Field of Classification Search
None
See application file for complete search history.

(56) References Cited

U.S. PATENT DOCUMENTS

| | | | | |
|---|---|---|---|---|
| 5,920,705 A * | 7/1999 | Lyon et al. | | 709/240 |
| 6,615,383 B1 * | 9/2003 | Talluri et al. | | 714/749 |
| 6,694,336 B1 * | 2/2004 | Multer et al. | | 1/1 |
| 2002/0188930 A1 * | 12/2002 | Moser et al. | | 717/129 |
| 2004/0139166 A1 * | 7/2004 | Collison | | 709/207 |
| 2009/0055839 A1 * | 2/2009 | Chan et al. | | 719/319 |

OTHER PUBLICATIONS

Oreizy, Peyman "Runtime Software Adaptation: Framework, Approaches, and Styles".
Taylor, Richard N. "Architectural Styles for Runtime Software Adaptation".

* cited by examiner

*Primary Examiner* — H S Sough
*Assistant Examiner* — Craig Dorais
(74) *Attorney, Agent, or Firm* — Patents On Demand P.A.; Brian K. Buchheit; Scott M. Garrett

(57) ABSTRACT

A message flow within a message broker can be identified. The message flow can include nodes and connections. The nodes can include a reflective node, a pre-defined node and a user-defined node. The message broker can be an intermediary computer program code able to translate a message from a first formal messaging protocol to a second formal messaging protocol. The code can be stored within a computer readable medium. The reflective node within the message flow can be selected. The reflective node can be associated with an external resource which can be an executable code. The external resource can be executed which can result in the modifying of the structure of the message flow. The modification can occur during runtime. The modification can include node and/or connection adding, altering, and deleting.

20 Claims, 3 Drawing Sheets

PROGRAMMATIC MODIFICATION OF A MESSAGE FLOW DURING RUNTIME

BACKGROUND

The present invention relates to the field of message passing and, more particularly, to programmatic modification of a message flow during runtime.

Application integration, at a high level, can refer to a solution that can be implemented to integrate software applications within and between organizations. Historically, application integration focused on the integration of legacy software applications, such as between different departments, divisions within companies, or new acquisitions. Within an organization, these applications often vary considerably across departments, can exist on different platforms, can be written in different programming languages, and can use different data formats. Integrating the applications within a Service Oriented Architecture can be a practical and cost effective solution over the alternative of re-writing the existing applications.

Within SOA infrastructures, message passing can be an integral component which can give rise to flexible, reusable, and robust application integration. Message passing typically includes a message broker which can perform a multitude of message handling operations. That is the message broker can facilitate inter-application communication within the organization. The message broker can process messages within message flows which are currently static. That is, the message flow cannot be dynamically self-regulating and/or responsive to messages, internal states, context, and stimuli.

Current solutions for improving message flow processing include manually modifying a message flow. For example, a message flow design can be modified by a middleware analyst in response to performance metrics which can indicate a bottleneck. Manually modified message flows must be redeployed and continually optimized through human intervention. This approach can be time-consuming and error-prone which can significantly impact infrastructure costs.

BRIEF SUMMARY

One aspect of the present invention can include a method, a computer program product, a system, and an apparatus for programmatic modification of a message flow during runtime. A message flow within a message broker can be identified. The message flow can include nodes and connections. The nodes can include a reflective node, a pre-defined node and a user-defined node. The message broker can be an intermediary computer program code able to translate a message from a first formal messaging protocol to a second formal messaging protocol. The code can be stored within a computer readable medium. The reflective node within the message flow can be selected. The reflective node can be associated with an external resource which can be an executable code. The external resource can be executed which can result in the modifying of the structure of the message flow. The modification can occur during runtime. The modification can include node and/or connection adding, altering, and deleting.

Another aspect of the present invention can include a system for programmatically modifying a message flow during runtime. In this aspect, a flow engine can be able to execute a message flow including a node, a connection, and a reflective node. The flow engine can be associated with a message broker. The reflective node can be associated with an external resource. The external resource can be an executable code able to structurally modify the message flow. The message queue can be configured to persist a message which can be associated with an application. The application can be a computer program code stored within a computer readable medium. The application can be associated with an application server. The configuration setting can link the reflective node to the external resource and/or a parameter. The parameter can be an execution setting value.

DETAILED DESCRIPTION

Figure 1:
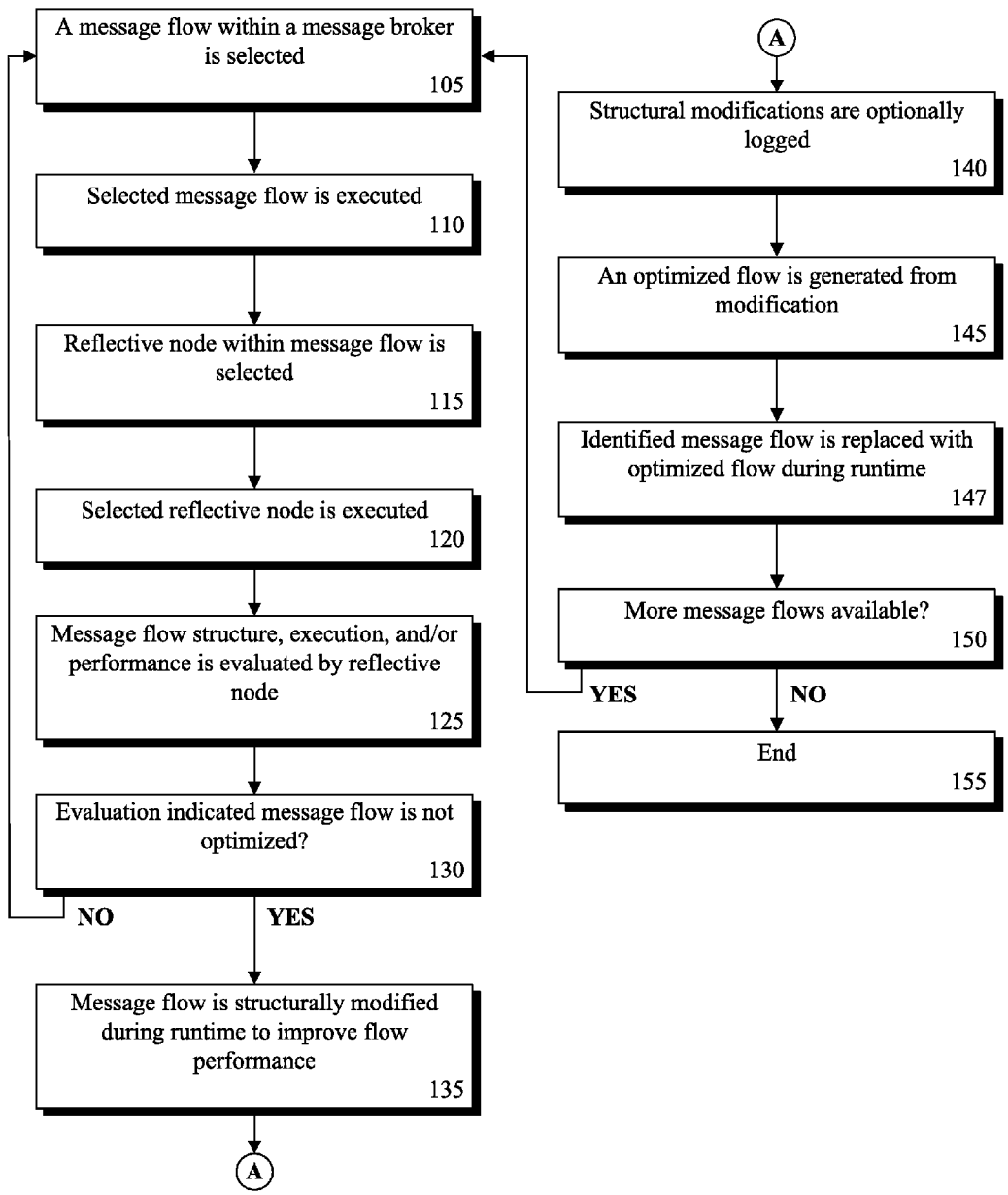
FIG. 1 is a flowchart illustrating a method for programmatic modification of a message flow during runtime in accordance with an embodiment of the inventive arrangements disclosed herein.

The present disclosure is a solution for programmatic modification of a message flow during runtime. In the solution, a message flow can be structurally modified during runtime in response to one or more operational inputs. Operational inputs can include, but is not limited to, metrics, states, context, stimuli, and the like. Structural modification can include, but is not limited to, node manipulation (e.g., addition, alteration, deletion), connection manipulation (e.g., insertion, modification, deletion), bend point manipulation, and the like. In one embodiment, a reflective node within a message flow can permit the execution of structural application programming interface (API) facilities which can modify the message flow at runtime. In the embodiment, the reflective node can be linked to a timeout node which can provide periodic triggering of reflective node functionality.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart illustrating a method 100 for programmatic modification of a message flow during runtime in accordance with an embodiment of the inventive arrangements disclosed herein. In method 100, a message flow executing within a message broker can be dynamically modified during runtime. The message flow can include a reflective node able to perform structural adjustments to the message flow in response to operational inputs. In one embodiment, the method 100 can be performed in real-time or near real-time.

As used herein, a message flow can be a software construct including two or more nodes capable of performing a set of actions upon a message. The message flow nodes can be connected via a connection. A connection can be a linkage between nodes of a message flow which a message can be conveyed. Nodes can be an executable software entity able to process a portion of a message. Nodes can be associated with a terminal which can permit node linking The terminal can be inputs, outputs, and the like. Nodes can include, but is not limited to, pre-defined (e.g., built-in nodes), user-defined nodes, a subflow, and the like. Node functionality can include, but is not limited to, message processing, message transformation, message routing, aggregation, filtering, and the like.

As used herein, a message can be an application message conveyed from an application to another application. The message can be an automatically generated digital artifact conforming to one or more traditional and/or proprietary formats. In one instance, the message can be an Extensible Markup Language (XML) message.

An application can be a software program within an application messaging infrastructure. Application messaging infrastructure can be a hardware/software platform for permitting the loose coupling of applications over a message passing bus. In one instance, the application messaging infrastructure can include a Service Oriented Architecture (SOA). It should be appreciated that message flow within method 100 can be present within a distributed computing environment, network computing environment, cloud computing environment, and the like.

In step 105, a message flow within a message broker can be selected. Selection can be performed based on one or more criteria including, but not limited to, performance metrics, message flow complexity, owner, and the like. In step 110, the selected message flow can be executed. Execution can be performed in real-time within a dynamic computing environment. In step 115, a reflective node within the message can be selected. The reflected node can be selected based on execution order, periodic node selection, and the like. The reflective node can be pre-defined, user-defined, a subflow, and the like.

In step 120, the selected reflective node can be executed. Execution can include performing programmatic actions associated with an external resource. The executable resource can be an external resource can be an executable entity including, but not limited to, an executable code, application programming interface (API), and the like. Executable code can include, but is not limited to, JAVA, C, Practical Extraction and Reporting Language (PERL), and the like.

In step 125, the reflective node can evaluate the message flow structure, execution, and/or, performance. Structural evaluation can include, but is not limited to, traditional and/or proprietary analysis to determine structural improvements and/or optimizations. Evaluation of message flow evaluation can include, but is not limited to, execution connection examination, node activity, and the like. Evaluation of message flow performance can include, but is not limited to, collecting metrics, analyzing execution metrics, and the like.

In step 130, if the evaluation of the message flow indicated the flow is not optimized, the method can proceed to step 135, else return to step 105. In step 135, the message flow can be structurally modified during runtime to improve performance. In one embodiment, the message flow can be modified and redeployed automatically. In step 140, structural modification can be optionally logged. Message flow modifications can be recorded as an original message flow structure, deltas, and the like. Modifications can permit auditing, change tracking, and the like.

In step 145, an optimized flow can be generated from structural modifications. To ensure operability, the optimized flow can be subjected to consistency tests, syntax testing, and the like. In one instance, testing can be performed automatically in response to the generation of the optimized flow. In another instance, testing can be performed manually via a message flow software tool.

In step 147, the identified message flow can be replaced in with the optimized flow during runtime. In one instance, the selected message flow structure can be dynamically modified and utilized in real-time. In the instance, the message flow can be altered and redeployed automatically. In one configuration of the instance, message flow runtime state can be maintained permitting message processing state to be persisted. In step 150, if more message flows are available, the method can return to step 150, else continue to step 155. In step 155, the method can end.

Drawings presented herein are for illustrative purposes only and should not be construed to limit the invention in any regard. Method 100 can be performed for multiple message flows simultaneously. That is, message flow optimization can be performed in parallel, enabling rapid improvements to be achieved. In one embodiment, method 100 can be iteratively executed, allowing message flows to be continually optimized due to environmental requirements and/or changes.

Figure 2:
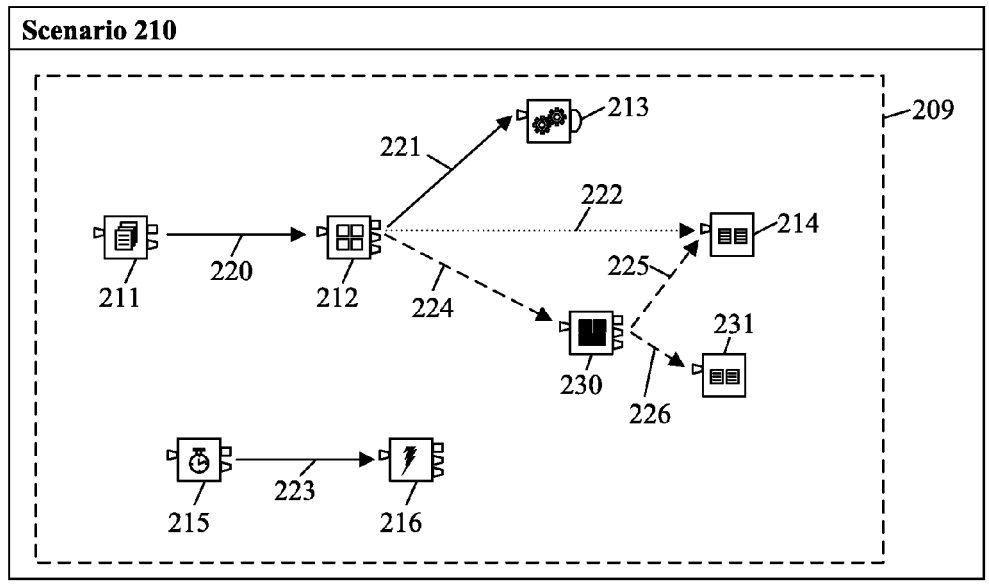
FIG. 2 is a schematic diagram illustrating a set of scenarios for programmatic modification of a message flow during runtime in accordance with an embodiment of the inventive arrangements disclosed herein.
Figure 2:
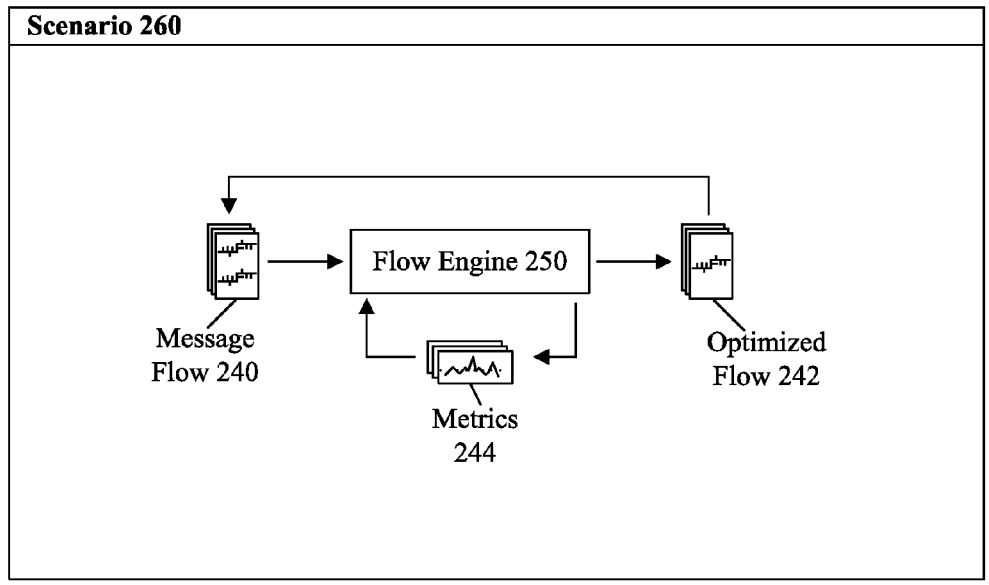

FIG. 2 is a schematic diagram illustrating a set of scenarios 210, 260 for programmatic modification of a message flow during runtime in accordance with an embodiment of the inventive arrangements disclosed herein. Scenario 210, 260 can be present in the context of method 100. In the scenario 210, a message flow 209 within a message queue and/or a message broker (e.g., flow engine 250) can be programmatically modified. The structure of the message flow 209 can be altered during runtime in response to one or more events. Events can include automated triggers and manually triggered actions. In the scenario 210, modification of flow 209 structure can include the addition of nodes 230, 231 and connections 224, 225.

It should be understood that in scenario 210 message flow 209 can be visually represented as a directed graph 209. Message flow 209 can be visually presented within an interface of a message flow editor (e.g., interface 344). In the scenario, nodes 211-216, 230, 231 can be represented as graphical icons. Message flow connections (e.g., routes) can be represented by directed lines 220-226. Dashed lines 224-226 can represent dynamically inserted connections resulting from the execution of node 216. Dotted line 222 can represent a deleted connection between node 212-214 resulting from the node 216 execution.

In scenario 210, a message flow 209 can include nodes 211-216 linked via connections 220-223. Nodes 215, 216 can be present within flow 209 which can be linked together by connection 223. Node 215, 216 can trigger periodic evaluation of flow 209 through executable code associated with the node 216. When necessary (e.g., performance problems), flow 209 can be structurally modified during runtime. In the scenario, flow 209 can be modified through the addition of nodes 230-231 and connections 224-226. Connection 222 can be removed creating a new message flow connection linking node 212 to 214 via node 230 and connection 224, 225. That is a new route (e.g., connection 224 and 225) can be created.

Node 230, 231 can be linked via connection 226 which can permit node 230 to accommodate multiple connections. Node 230 selection can be performed based on terminal configuration (e.g., inputs and/or outputs). Criteria for node selection can include, but is not limited to, input/output quantity, processing capabilities, and the like. In one embodiment, node linking can be automatically verified ensuring message flow operability. In one instance, alternate linking can be performed to enable robust improvements to a flow 209. In the instance, an alternative output of a node can be identified and a link can be established from the node to another appropriate node.

In one instance, node 215 can be a timeout node, activating execution of node 216 periodically. In the instance, node 215 timeout value can be an automatically and/or manually determined value.

In one instance, node 216 can be a dynamic flow update node associated with an application programming interface (API). In the instance, node 216 can execute a JAVA API functionality permitting structural modification of the message flow 209.

In one embodiment, node insertion can include the addition of a JAVACOMPUTE node within flow 209.

In scenario 260, a flow engine 250 can permit iterative improvement of message flow 240 to be achieved. Flow engine 250 can be a component of a message broker associated with a messaging architecture. Message flow 240 can be continually improved utilizing real-time metrics 244. In the scenario 260, collected metrics 244 can be employed as input parameters for driving message flow 240 optimization. Metrics 244 can include, but is not limited to, throughput, individual node performance, route performance, metrics, flow response time, and the like. Metrics 244 can be collected from engine 250, logging resources, external programs, and the like.

Message flow 240 can be received as input by flow engine 250. Engine 250 can utilize metrics to determine appropriate structural changes. For instance, when a message flow route performs below a threshold value, engine 250 can execute a programmatic restructuring. Changes to message flow 240 can be persisted as an output from engine 250 which can be an optimized flow 242. Optimized flow 242 can be a structurally different message flow from message flow 240. Flow 242 can be generated in real-time in response to metrics 244. In one instance, flow 242 can be tested prior to deployment to determine performance change characteristics. In the instance, when flow 242 can performance surpasses message flow 240, the message flow 242 can be deployed.

Drawings presented herein are for illustrative purposes only and should not be construed to limit the invention in any regard. In one instance, scenario 210 can permit the modification of a different message flow. In the instance, message flow 209 can insert a reflective node into the different message flow permitting the different message flow to perform self-modifications.

Figure 3:
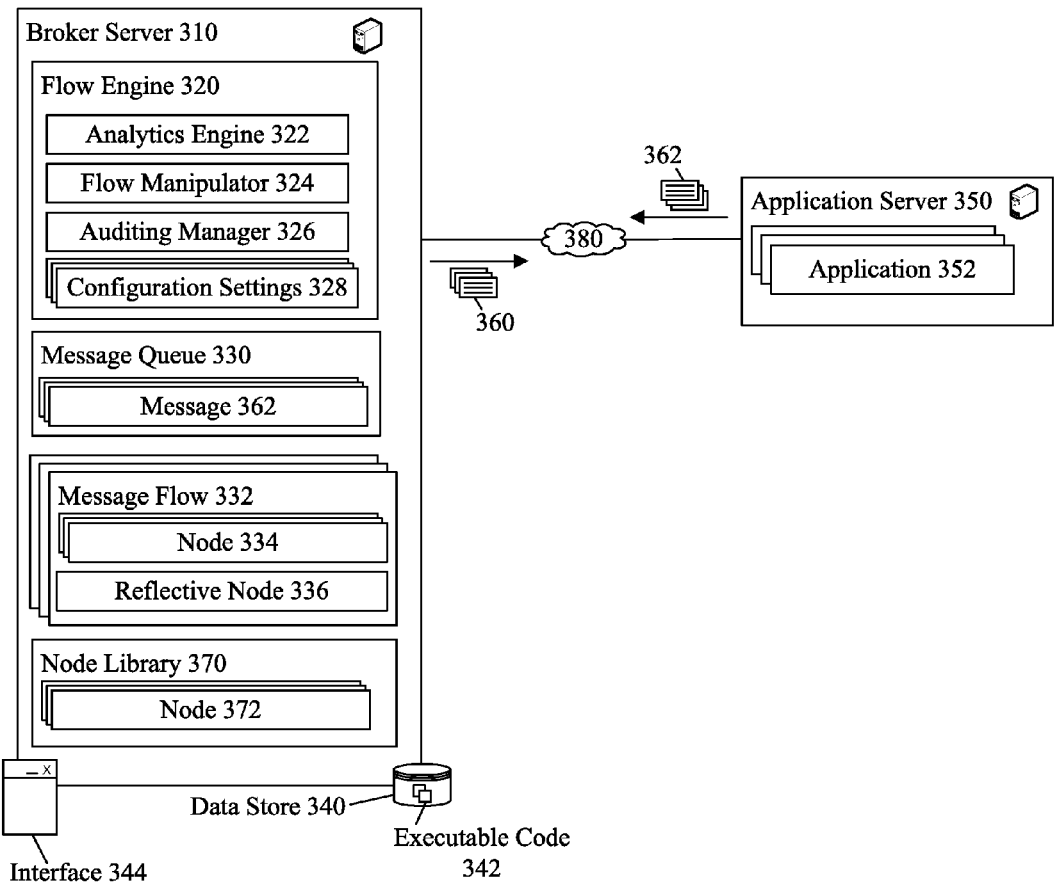
FIG. 3 is a schematic diagram illustrating a system for programmatic modification of a message flow during runtime in accordance with an embodiment of the inventive arrangements disclosed herein.

FIG. 3 is a schematic diagram illustrating a system 300 for programmatic modification of a message flow during runtime in accordance with an embodiment of the inventive arrangements disclosed herein. System 300 can be present in the context of method 100 and scenario 210, 260. In system 300 a flow engine 320 can permit the execution of a reflective node 336 enabling message flow 332 to be structurally modified during runtime. Engine 320 can be a component of server 310 which can be communicatively linked to application server 350 via network 380. Application 352 can convey message 362 to message queue 330 for processing. Message flow 332 can process (e.g., protocol conversion) message 362 and generate message 360.

Broker server 310 can be a hardware/software component able to receive and transmit message 362, 360. Server 310 can include, but is not limited to, flow engine 320, message queue 330, message flow 332, node library 370, data store 340, interface 344, and the like. Server 310 functionality can include, but is not limited to, message translation, message validation, message transformation, message routing, and the like. In one instance, server 310 can be a component of an IBM WEBSPHERE MESSAGE BROKER. That is, server 310 can be a component of an enterprise service bus.

Flow engine 320 can be a hardware/software component for altering message flow 332 during runtime. Flow engine 320 can include, but is not limited to, analytics engine 322, flow manipulator 324, auditing manager 326, configuration settings 328, and the like. Flow functionality can include, but is not limited to 320, flow manipulation, flow analysis, flow validation, error handling, flow/message security, and the like. In one instance, flow engine 320 can be a network element within a distributed computing environment.

Analytics engine 322 can be a hardware/software entity able to assess message flow 322 performance. Engine 322 functionality can include, but is not limited to, metric collection, flow 322 analytics, and the like. Engine 322 can perform flow analytics upon flow 332 and/or an optimized flow. In one instance, engine 322 can be an external component associated with a network computing environment.

Flow manipulator 324 can be a hardware/software component able to adjust flow 332 during runtime in response to one or more conditions. Manipulator functionality can include, but is not limited to, node manipulation, connection adjustment, and the like. Node manipulation can include, but is not limited to, node insertion, modification, and deletion. Connection adjustment can include, but is not limited to, connection addition, adjustment, and removal. In one instance, manipulator 324 can select a node 372 from node library 370 when insertion of a node is necessary. In the instance, preconfigured node 372 can be inserted into message flow 332.

Auditing manager 326 can be a hardware/software entity able to track message flow 332 changes. Manager 326 functionality can include, but is not limited to, logging, audit reporting, change history, and the like. Manager 326 tracking can include, node level tracking, flow revision tracking, and the like. In one instance, manager 326 can permit changes to a message flow 332 to be reverted.

Configuration settings 328 can be a collection of settings for controlling the behavior of engine 320. Settings 328 can include, but is not limited to, node identification values, message flow identification, executable code identifiers, parameters, metrics settings, security settings, business rules, and the like. In one embodiment, settings 328 can permit reflective node 336 to be linked with an executable code. For instance, setting 329 can allow a reflective node (e.g. Ref_A) to be associated with an executable code (e.g., Exe_B) and a set of parameters (e.g. Param_A).

Message queue 330 can be a programmatic queue able to temporarily persist message 362 and/or message 360. Queue 330 can receive message 362 which can be stored for processing by message flow 332. Queue 330 can be a queue 330 associated with a message broker. Queue 330 can include, but is not limited to, a stack, queue, heap, and the like. Queue 330 processing order can include, but is not limited to, Last In First Out (LIFO), First In First Out (FIFO), and the like.

Message flow 332 can be a software construct able to process message 360, 362. Message flow 332 can include, but is not limited to, node 334, reflective node 336, and the like. Message flow 332 logic can include, but is not limited to, Extended Structured Query Language (ESQL), JAVA, Extensible Style sheet Language for Transformations (XSLT), and the like.

Node library 370 can be a software artifact for storing node 372 which can be utilized to dynamically modify message flow 332 during runtime. Node 372 can include, but is not limited to, a pre-defined node (e.g., filter node), a user-defined node, and the like. Library 370 can be automatically and/or manually populated. In one instance, library can be stored within data store 340 and/or an external repository.

Data store 340 can be a hardware/software entity capable of persisting executable code 342. Data store 340 can include, but is not limited to, a Storage Area Network (SAN), Network Attached Storage (NAS), and the like. Data store 340 can include, but is not limited to, a Relational Database Management System (RDMS), Object Oriented Database Management System (OODBMS), and the like.

Executable code 342 can be a programmatic resource able to dynamically modify message flow 332. Code 342 can be stored as programmatic instructions, binary code, and the like. Code 342 can be associated with permissions, access control lists (ACL), settings, and the like. In one instance, code 342 can be stored within data store 340. In the instance, code 342 can be stored within a database structure (e.g., table).

Interface 344 can be a user interface for configuring resources within system 300. Interface 344 can permit presentation and/or modification of configuration settings 328, message 360, 362, message flow 332, reflective node 336. In one instance, interface 344 can be associated with an IBM WEBSPHERE BROKER message flow editor. In the instance, interface 344 can be an IBM WEBSPHERE MESSAGE BROKERS EXPLORER software. Interface can be a graphical user interface, voice user interface, text-based user interface, mixed-mode interface, and the like.

Application server 350 can be a hardware/software platform for executing application 352. Server 350 can include, but is not limited to, application 352, message queue (not shown), configuration settings, and the like. Server 350 can be a traditional and/or proprietary execution environment. In one instance, server 350 can be an IBM WEBSPHERE APPLICATION SERVER.

Network 380 can be a hardware/software entity for communicatively linking system 300 components in real-time or near real-time. Network 380 can include, but is not limited to, wired technologies, wireless technologies, and the like. Network 380 can be, but is not limited to, Local Area Network (LAN), Wide Area Network (WAN), Metropolitan Area Network (MAN), and the like.

Drawings presented herein are for illustrated purposes only and should not be construed to limit the invention in any regard. Server 310 can be a component of a distributed computing environment, networking computing environment, cloud computing environment, and the like. System 300 architecture can include, publish/subscribe, distributed publish/subscribe, and the like. In one instance, server 310 functionality can be a portion of a Web-enabled Service. It should be appreciated that system 300 can be associated with one or more protocols including, but not limited to, Simple Object Access Protocol (SOAP), Transport Control Protocol (TCP), Internet Protocol (IP), Hypertext Transport, Protocol, Extensible Markup Language Remote Procedure Call (XML-RPC), and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for programmatic modification of a message flow comprising:
    a flow engine able to execute a message flow comprising a reflective node and at least one of a node and a connection, wherein the flow engine is associated with a message broker, wherein the reflective node is associated with an external resource, wherein the external resource is an executable code able to structurally modify the message flow;
    a message queue configured to persist a message, wherein the message is associated with an application, wherein the application is a computer program code stored within a computer readable medium, wherein the application is associated with an application server;
    a flow manipulator able to execute the external resource during runtime, wherein the external resource is able to perform at least one of a node alteration and a connection adjustment, wherein the node alteration is at least one of a node insertion, a node modification, and a node deletion, wherein the connection adjustment is at least one of a connection insertion, a connection modification, and a connection deletion; and
    a configuration setting capable of linking the reflective node to at least one of the external resource and a parameter, wherein the parameter is an execution setting value, wherein the reflective node is within the message flow and permits execution of structural application program interface (API) facilities, which modify the message flow at runtime, and wherein the reflective node is linked to a timeout node, which provides iterative triggering of reflective node functionality.

2. The system of claim 1 further comprising:
    an analytics engine configured to perform an analysis of the message flow, wherein the analysis is based on a collection of metrics, wherein the analytics engine conveys the metrics to the flow engine; and
    an auditing manager capable of persisting at least one of a message flow change and an error, wherein the message flow change is persisted as at least one of a delta and a revision.

3. The system of claim 2, wherein the metrics are collected in real-time.

4. The system of claim 1, wherein the external resource is associated with a node library, wherein the node library comprises at least one of a pre-defined node and a user-defined node.

5. The system of claim 1, wherein the reflective node is connected to a timeout node, wherein the timeout node is configured to periodically execute the reflective node.

6. The system of claim 1, further comprising: a flow analysis unit operable to determine the alterations to be performed on the message flow to optimize the message flow.

7. The system of claim 1, wherein the external resource is an application programming interface (API) configured to perform structural modifications to the message flow.

8. A computer program product comprising a computer readable storage medium having computer usable program code embodied therewith, the computer usable program code comprising:
    computer usable program code stored in a tangible storage medium, when said computer usable program code is executed by a processor it is operable to identify a message flow within a message broker, wherein the message flow comprises a plurality of nodes and connections, wherein the plurality of nodes comprises of a node and a reflective node, wherein the node is at least one of a pre-defined node and a user-defined node, wherein the message broker is an intermediary computer program code able to translate a message from a first formal messaging protocol to a second formal messaging protocol, wherein the intermediary computer program code is stored within a computer readable medium;
    computer usable program code stored in a tangible storage medium, when said computer usable program code is executed by a processor it is operable to select the reflective node within the message flow, wherein the reflective node is associated with an external resource, wherein the external resource is an executable code, wherein the reflective node is within the message flow and permits execution of structural application program interface (API) facilities, which modify the message flow at runtime, wherein the reflective node is linked to a timeout node, which provides iterative triggering of reflective node functionality;
    computer usable program code stored in a tangible storage medium, when said computer usable program code is executed by a processor it is operable to execute the external resource during runtime, wherein the external resource is able to perform at least one of a node alteration and a connection adjustment, wherein the node alteration is at least one of a node insertion, a node modification, and a node deletion, wherein the connection adjustment is at least one of a connection insertion, a connection modification, and a connection deletion; and
    computer usable program code stored in a tangible storage medium, when said computer usable program code is executed by a processor it is operable to execute the external resource wherein the executing results in the modifying of the structure of the message flow, wherein the modification is the adding, altering, and deleting of the node, wherein the modifying occurs during runtime.

9. The computer program product of claim 8, further comprising:
    computer usable program code stored in a tangible storage medium, when said computer usable program code is executed by a processor it is operable to determine the modifications to be performed on the structure of the message flow to optimize the message flow.

10. The computer program product of claim 8, further comprising:
  computer usable program code stored in a tangible storage medium, when said computer usable program code is executed by a processor it is operable to maintain a log of the structural modification in the tangible storage medium.

11. The computer program product of claim 10, wherein the reflective node is connected to a timeout node, wherein the timeout node is a pre-defined node.

12. A computer program product comprising a computer readable storage medium having computer usable program code embodied therewith, the computer usable program code comprising:
  computer usable program code stored in a tangible storage medium, when said computer usable program code is executed by a processor is operable to identify a message flow within a message broker, wherein the message flow comprises a plurality of nodes and connections, wherein the plurality of nodes comprises of a node and a reflective node, wherein the node is at least one of a pre-defined node and a user-defined node, wherein the reflective node is associated with an external resource, wherein the message broker is an intermediary computer program code able to translate a message from a first formal messaging protocol to a second formal messaging protocol, wherein the intermediary computer program code is stored within a computer readable medium, wherein the reflective node is within the message flow and permits execution of structural application program interface (API) facilities, which modify the message flow at runtime, and wherein the reflective node is linked to a timeout node, which provides iterative triggering of reflective node functionality;
  computer usable program code stored in a tangible storage medium, when said computer usable program code is executed by a processor is operable to evaluate performance of the message flow; and
  computer usable program code stored in a tangible storage medium, when said computer usable program code is executed by a processor it is operable to automatic execute the external resource during runtime, wherein the external resource is able to perform at least one of a node alteration and a connection adjustment, wherein the node alteration is at least one of a node insertion, a node modification, and a node deletion, wherein the connection adjustment is at least one of a connection insertion, a connection modification, and a connection deletion, wherein the executing results in modification the structure of the message flow at runtime responsive to the performance of the message flow being less than a threshold, and wherein the modification is at least one of a node alteration and a connection adjustment.

13. The computer program product of claim 12, further comprising:
  computer usable program code stored in a tangible storage medium, when said computer usable program code is executed by a processor is operable to track changes to the message flow; and
  computer usable program code stored in a tangible storage medium, when said computer usable program code is executed by a processor is operable to maintain a log of the structural modification in the tangible storage medium.

14. The computer program product of claim 12, further comprising:
  computer usable program code stored in a tangible storage medium, when said computer usable program code is executed by a processor it is operable to determine the modifications to be performed on the message flow to optimize the message flow.

15. The computer program product of claim 12, further comprising:
  computer usable program code stored in a tangible storage medium, when said computer usable program code is executed by a processor it is operable to automatically deploy the modified message flow.

16. The computer program product of claim 12, wherein the evaluation of the performance of the message flow comprises evaluation of at least two of throughput, individual node performance, route performance metrics, and flow response time.

17. The computer program product of claim 12, wherein the evaluation of the performance of the message flow is performed periodically, wherein the reflective node is connected to a timeout node, wherein the timeout node is configured to periodically executes the reflective node.

18. The computer program product of claim 12, wherein the node alteration is at least one of addition of a node, deletion of a node and a modification of node.

19. The computer program product of claim 12, wherein the connection adjustment is at least one of a connection insertion, a connection modification, and a connection deletion.

20. The computer program product of claim 12, further comprising:
  computer usable program code stored in a tangible storage medium, when said computer usable program code is executed by a processor it is operable to present the modified message flow within a user interface.

* * * * *